United States Patent
Kwok et al.

(10) Patent No.: US 11,116,030 B2
(45) Date of Patent: Sep. 7, 2021

(54) 5G WIRELESS NETWORK CONNECTION SYMBOL POLICY

(71) Applicant: T-Mobile USA, Inc., Bellevue, WA (US)

(72) Inventors: Ming Shan Kwok, Seattle, WA (US); Yasmin Karimli, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/442,040

(22) Filed: Jun. 14, 2019

(65) Prior Publication Data

US 2020/0344839 A1 Oct. 29, 2020

Related U.S. Application Data

(60) Provisional application No. 62/840,285, filed on Apr. 29, 2019.

(51) Int. Cl.
*H04W 76/27* (2018.01)
*H04B 17/318* (2015.01)
(Continued)

(52) U.S. Cl.
CPC .......... *H04W 76/27* (2018.02); *H04B 17/318* (2015.01); *H04W 72/0453* (2013.01); *H04W 76/15* (2018.02)

(58) Field of Classification Search
None
See application file for complete search history.

(56) References Cited

U.S. PATENT DOCUMENTS 8,565,747 B2 10/2013 Karaoguz et al.
8,843,181 B2 9/2014 Seibert et al.
(Continued)

FOREIGN PATENT DOCUMENTS

| GB | 2505680 A | * | 3/2014 | ........ H04W 36/0083 |
| WO | WO-2016116145 A1 | * | 7/2016 | ............ H04W 84/04 |

(Continued)

OTHER PUBLICATIONS

Intel Corporation, "Dual Registration Solution for 5GS/EPS Interworking", R2-1802964, 3GPP TSG RAN WG2 Meeting #101, Athens, Greece, Feb. 16, 2018, pp. 1-3.

(Continued)

*Primary Examiner* — Ayanah S George
(74) *Attorney, Agent, or Firm* — Lee & Hayes, P.C.

(57) ABSTRACT

Techniques for presenting a symbol on a display of a wireless device indicative of wireless resources based on network states and device states are discussed herein. For example, the network state may indicate whether the wireless device is operating in a cellular network that has areas of dual signal coverage. A device state may include whether the device is actively communicating via a connection or is idle. The techniques may further determine a frequency of wireless resources associated with the dual connectivity environment. A network identifier can be presented via a display of the wireless device. Network identifiers might include, for example, symbols that indicate 3G, 4G, LTE, 5G, dual connectivity, and so forth, corresponding to different wireless network standards and/or connections.

20 Claims, 7 Drawing Sheets

(51) Int. Cl.
*H04W 76/15* (2018.01)
*H04W 72/04* (2009.01)

(56) References Cited

U.S. PATENT DOCUMENTS

| | | | |
|---|---|---|---|
| 9,031,606 | B2 | 5/2015 | Daniel |
| 9,277,345 | B2 | 3/2016 | Lui et al. |
| 9,615,304 | B2 | 4/2017 | Breuer et al. |
| 9,628,115 | B1 * | 4/2017 | Tsai .................. G06F 3/0418 |
| 9,907,007 | B1 | 2/2018 | Xue et al. |
| 10,027,573 | B2 | 7/2018 | Shaw et al. |
| 10,397,840 | B2 | 8/2019 | Shaw et al. |
| 2006/0062149 | A1 | 3/2006 | Bednasz |
| 2008/0014934 | A1 | 1/2008 | Balasubramanian et al. |
| 2009/0137247 | A1 | 5/2009 | Mok |
| 2010/0099405 | A1 | 4/2010 | Brisebois et al. |
| 2010/0135183 | A1 | 6/2010 | Suzuki et al. |
| 2012/0258715 | A1 | 10/2012 | Souissi et al. |
| 2013/0110565 | A1 | 5/2013 | Means, Jr. et al. |
| 2013/0237220 | A1 | 9/2013 | Lee et al. |
| 2015/0045020 | A1 | 2/2015 | Wang et al. |
| 2015/0173004 | A1 | 6/2015 | Nigam et al. |
| 2015/0271317 | A1 | 9/2015 | Nelson et al. |
| 2016/0192370 | A1 * | 6/2016 | Chan .................. H04W 76/14 370/329 |
| 2016/0227475 | A1 | 8/2016 | Zhu et al. |
| 2016/0249268 | A1 | 8/2016 | Usui et al. |
| 2018/0019857 | A1 | 1/2018 | Kazmi et al. |
| 2018/0075798 | A1 | 3/2018 | Nho et al. |
| 2018/0082633 | A1 | 3/2018 | Tan et al. |
| 2018/0332659 | A1 | 11/2018 | Hwang et al. |
| 2018/0368016 | A1 | 12/2018 | Lee et al. |
| 2019/0069205 | A1 | 2/2019 | Lee et al. |
| 2019/0069229 | A1 * | 2/2019 | Lee .................. H04W 88/06 |
| 2019/0379469 | A1 | 12/2019 | Lu et al. |
| 2020/0068456 | A1 | 2/2020 | Humbert et al. |
| 2020/0068482 | A1 | 2/2020 | Lu et al. |
| 2020/0068638 | A1 | 2/2020 | Au et al. |
| 2020/0084682 | A1 | 3/2020 | Wang et al. |
| 2020/0092774 | A1 | 3/2020 | Sharma et al. |
| 2020/0112845 | A1 | 4/2020 | Zhao et al. |

FOREIGN PATENT DOCUMENTS

| | | |
|---|---|---|
| WO | WO2016116145 A1 | 7/2016 |
| WO | WO2016188701 A1 | 12/2016 |
| WO | WO2017196106 A1 | 11/2017 |

OTHER PUBLICATIONS

Office Action for U.S. Appl. No. 16/378,202, dated Nov. 22, 2019, Humbert, Displaying Network Availability in Dual Connectivity Networks, 10 pages.
The PCT Search Report and Written Opinion dated Dec. 30, 2019 for PCT Application No. PCT/US2019/047553, 12 pages.
Office Action for U.S. Appl. No. 16/378,179, dated Jan. 24, 2020, Lu, "Variable Interval Signal Scanning in Dual Connectivity Communication Networks", 10 Pages.
Office Action for U.S. Appl. No. 16/378,179, dated Apr. 2, 2020, Lu, "Variable Interval Signal Scanning in Dual Connectivity Communication Networks", 9 Pages.
Office Action for U.S. Appl. No. 16/378,179, dated Aug. 15, 2019, Lu, "Variable Interval Signal Scanning in Dual Connectivity Communication Networks", 8 pages.
The PCT Search Report and Written Opinion dated Oct. 1, 2019, for PCT Application No. PCT/US2019/034110, 11 pages.
The Extended European Search Report dated Sep. 23, 2020 for European Patent Application No. 20168539.3, 10 pages.
"LS Reply to 3GPP SA2 on Status Icon related to 5G", retrieved on Jan. 21, 2018 at <<http://www.3gpp.org/ftp/Meetings%5F3GPP%5FSYNC/SA2/Docs/>>, [retrieved on 2018—vol. SA WG2, No. Gothenburg, Sweden: Jan. 22, 2018-Jan. 26, 2018, 3GPP Draft, 3rd Generation Partnership Prokect (3GPP), Jan. 21, 2018, pp. 1-4.
Office Action for U.S. Appl. No. 16/120,605, dated May 26, 2020, Lu, "Network Symbol Display in Dual Connectivity Regions", 11 Pages.
Office Action for U.S. Appl. No. 16/378,179, dated Jun. 25, 2020, Lu, "Variable Interval Signal Scanning in Dual Connectivity Communication Networks", 10 pages.
Office Action for U.S. Appl. No. 16/791,969, dated Jan. 6, 2021, Humbert, "Service Type Symbols", 14 Pages.
Office Action for U.S. Appl. No. 16/120,605, dated Oct. 8, 2020, Lu, "Network Symbol Display in Dual Connectivity Regions", 13 Pages.

\* cited by examiner

5G WIRELESS NETWORK CONNECTION SYMBOL POLICY

CROSS-REFERENCE TO RELATED APPLICATION

This application claims priority to a commonly owned U.S. Provisional Patent Application No. 62/840,285, filed on Apr. 29, 2019, and titled "5G Icon Refresh Delay Timer," which is herein incorporated by reference in its entirety.

BACKGROUND

Cellular communication devices use network radio access technologies to communicate wirelessly with geographically distributed cellular base stations. Long-Term Evolution (LTE) is an example of a widely implemented radio access technology that is used in 4th Generation (4G) communication systems. New Radio (NR) is a newer radio access technology that is used in 5th Generation (5G) communication systems. Standards for LTE and NR radio access technologies have been developed by the 3rd Generation Partnership Project (3GPP) for use by wireless communication carriers.

One architecture option, along with a suite of communication protocols and operations defined by the 3GPP, is referred to as EN-DC (Evolved Universal Terrestrial Radio Access Network (E-UTRAN)/New Radio-Dual Connectivity). EN-DC enables the simultaneous use of LTE and NR radio access technologies for communications between a mobile device and a cellular communication network, and may also be referred to as LTE/NR dual connectivity. EN-DC is described by 3GPP Technical Specification (TS) 37.340.

EN-DC can be implemented using a 4G core network supporting both LTE (4G) and 5G (NR) base stations, in a configuration known as Non-Standalone Architecture (NSA). In this configuration, a 4G LTE base station (referred to as a Master eNodeB or MeNB) is associated (e.g., via an X2 interface) with a 5G NR base station (referred to as a Secondary gNodeB or SgNB). In an NSA system, both the LTE base station and the NR base station are supported by a 4G core network. However, control communications are between the 4G core network and the LTE base station, and the LTE base station is configured to communicate with and to control the NR base station.

Existing 4G networks use relatively low radio frequencies, such as frequencies in bands below 6 GHz. 5G networks are able to use an extended range of frequency bands compared to 4G networks, such as higher frequency bands in the 6-100 GHz spectrum. Frequency bands in the 6-100 GHz spectrum are generally referred as mmWave frequency bands as their wavelength is within the millimeter range. Radio communications using the higher frequency 5G bands can support higher data speeds, but also have disadvantages compared to the lower frequency bands. Specifically, radio signals in the higher frequencies have shorter range and are more easily blocked by physical objects. Accordingly, the ability for a communication device to communicate using higher-frequency 5G bands may be sporadic as the device is physically moved.

Communication devices such as smartphones often have a status bar that shows, among other things, the current signal strength and/or signal quality of the current wireless connection with a base station. In addition, the status bar may have a network indicator, such as an icon or symbol, that indicates the network type being used for the current wireless connection. For example, the network indicator might comprise a "4G LTE" symbol when the current connection is over an LTE network, and a 5G symbol when the current connection is over a 5G network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Described herein are techniques for determining which of multiple network identifiers to display on the status bar of a wireless communication device, when the device is operating in a cellular network of a wireless communications provider that has areas of dual signal coverage. In some examples, a symbol indicative of a wireless resource can be determined based at least in part on a policy. Network identifiers might include, for example, symbols that indicate 3G, 4G, LTE, 5G, and so forth, corresponding to different wireless network standards.

The described techniques may be useful when a wireless communication device is within an area that is supported by both 4G and 5G technologies, for example. In this situation, 5G signals may be intermittent because of their higher frequencies.

When using 5G Non-Standalone Architecture (NSA), an initial connection between the device and an LTE base station can be configured based on LTE system information. System information in the LTE environment can be broadcast by the LTE base station in data objects referred to as System Information Blocks (SIBs). System information may include information relating to cell access, scheduling, communication channels and frequencies, network identifiers, tracking area codes (TACs), cell IDs, status, power levels, paging information, neighboring cells, etc.

Cellular communication devices can receive the LTE system information prior to establishing connections with LTE base stations, as well as during the connections. When there are changes in the system information of an LTE base station, connected cellular communication devices can be notified and the changes can be retrieved from subsequently broadcast SIBs.

In a cell that supports NSA, and that therefore has both LTE and NR base stations, the LTE base station can be configured to broadcast information indicating that the cell supports NSA Dual Connectivity. This information may be included in an LTE SIB. In accordance with 3GPP TS 36.331 Release 15, this information can be conveyed by a single-bit value called "upperLayerindication" within what is known as SIB2. This value may be referred to at times herein as a 5G availability indicator.

A wireless communication device, often referred to in this environment as a User Equipment (UE) or Mobile Station (MS), monitors the broadcast channels of one or more nearby LTE base stations in order to receive LTE SIBs. When in a cell that supports NSA, the upperLayerindication value may indicate NSA support, but may nevertheless be in a location where NR signals of the cell are too weak to be used. This may be particularly problematic when the device is in idle mode, because when in idle mode the device does not maintain an active 5G communication channel. Under NSA, 5G communication channels are instead set up only when the device is in a connected state.

When the device receives an SIB indication that the current LTE base station and network cell support NSA, the device can scan one or more 5G frequencies to search for a 5G broadcast signal, and can measure the signal strength of any broadcast signals that it finds in these frequencies. The device can be configured to do this without decoding the data conveyed by the broadcast signal, thereby saving computational resources that might otherwise be used.

In some implementations, the device may be configured to receive NR configuration information during initial attachment to the LTE base station. Specifically, the LTE base station may use RRC signaling with the device to specify the frequencies that are potentially used for NR broadcast transmissions by the NR base station associated with the LTE base station. Based on this information, the device can limit the search of NR frequencies to those that are actually in use, and avoid other frequencies that are not used by the communications provider in the area where the device is located.

In other implementations, the device may be preconfigured with stored information indicating the possible frequencies of NR transmissions by either the communications provider or by NR base stations in specific locations.

In some examples, the device can determine to present a symbol indicative of a wireless resource based at least in part on one or more policies. In some examples, a device can be associated with multiple policies and can implement a policy based on an instruction or based on other network information. In some examples, a policy can be determined based at least in part on a frequency band associated with one or more base stations.

In one example, a policy can include determining a connection status associated with a device (e.g., a user equipment). For example, a connection status can include a connected state (e.g., where the device is transmitting and/or receiving data, voice, and/or video data or otherwise engaged in a communication) or an idle state (e.g., where the device is not actively engaged in a communication). If the connection status indicates that the device is connected, the policy can include determining a bearer associated with the device or communication. For example, if the communication is associated with a split bearer (e.g., indicative of dual-connectivity), the policy can include presenting a symbol associated with a 5G communication. If the communication is associated with a single bearer, the policy can include presenting a symbol associated with the radio access technology associated with the single bearer (e.g., 3G, 4G, 4G LTE, 5G, etc.). If the connection status indicates that the device is idle, the policy can include determining whether the device is within range of a 5G base station. In some examples, the policy can include estimating whether the device is in range based on a strength of an LTE single (e.g., when the device is anchored via a 4G base station). In some examples, the policy can be based on location data, or the like. If the device is determined to be within range of a 5G base station (or within a threshold distance and/or signal strength associated with a 5G base station), the policy can include displaying a 5G symbol. If the device is not within range of the 5G base station, the policy can include displaying a 4G symbol.

In some examples, if the connection status indicates that the device is idle, a symbol indicative of a wireless resource can be based on another policy. For example, a first policy can be associated with a "conservative" policy that is based at least in part on radio access technology presence. For example, when a device is idle and is anchored using a first radio access technology (e.g., 4G), the policy can include presenting a symbol associated with the first radio access technology. A second policy can be associated with an "aggressive" policy that is based at least in part on information indicative of whether an anchor cell is associated with or capable of dual connectivity. For example, the second policy can include determining (e.g., via an LTE SIB-2 indication), whether an anchoring 4G base station is associated with a 5G base station (to provide dual connectivity), and if the 4G base station is associated, the second policy can include presenting a symbol indicative of a second radio access technology (e.g., 5G) when the device is anchored via the first radio access technology (e.g., 4G).

In some examples, a policy can be associated with one or more transitions associated with a connection status and/or a radio access technology. For example, a first transition can include transitioning from a connected state to an idle state. For example, and at a first time, a device can be connected via dual connectivity for a communication. The device can terminate or otherwise stop the communication at a second time after the first time. In some examples, the policy can include presenting a symbol indicative of a wireless resource at the first time (e.g., a 5G symbol, in the case the connection included dual connectivity). In some examples, when the communication is ended (at the second time), the policy can include initiating a timer to prevent a change in the symbol for a period of time. After a time period associated with the timer has elapsed, the policy can include presenting a symbol based at least in part on one or more policies discussed herein.

In a same or different example, a second transition can include transitioning from a 5G connection or a dual connectivity connection at a first time to a 4G connection at a second time. By way of example, a 5G connection may be temporarily interrupted due to the propagation characteristics of the 5G resources. In some examples, a policy can include initiating a timer at a time associated with an interruption and refraining from changing a symbol presented via the device indicative of a wireless resource until a time period associated with the timer has lapsed. After expiration of a timer, the policy can include determining a symbol based on the techniques discussed herein. In some examples, implementing such a timer can prevent "flickering" of a symbol, which can lead to confusing or a reduced customer experience.

Although the techniques are described in the context of 4G and 5G networks, the techniques described herein may also be used with different network types, standards, and technologies. That is, the techniques may be used more generally for first and second wireless communication networks, where a 4G network is an example of the first wireless communication network and a 5G network is an example of the second wireless communication network.

The systems, devices, and techniques described herein can improve the functioning of a device (e.g., a user equipment) by intelligently presenting a symbol indicative of a wireless resource based on one or more policies. For example, the techniques can include determining a connection state and/or characteristics of a network for determining a symbol. Presenting a symbol in accordance with the techniques discussed herein can improve a user experience by informing users of available network resources and associated expectation of the network resources. Further, the techniques discussed herein may conserve battery and/or processing time of a UE by determining to display a symbol based on a policy (e.g., without searching for an associated signal). The techniques may improve a functioning of a network by reducing initiation of communications where network resources are not available, which may reduce signaling and associated congestion. These and other improvements to the functioning of a computer and network are discussed herein.

Figure 1:
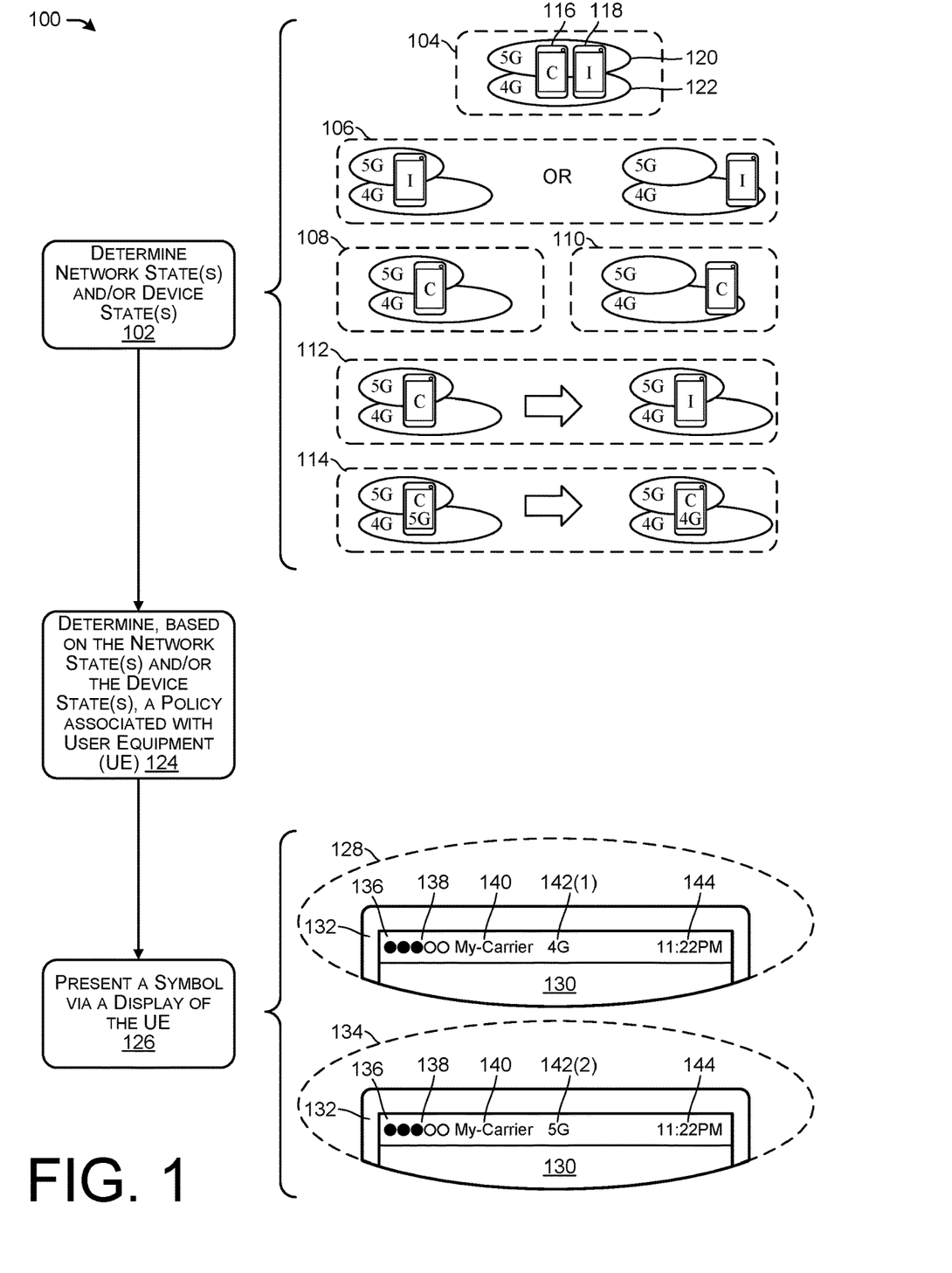
FIG. 1 illustrates a pictorial flow diagram for determining network and device states and presenting a symbol indicative of wireless resources based on a policy.

FIG. 1 illustrates a pictorial flow diagram 100 for determining network and device states and presenting a symbol indicative of wireless resources based on a policy.

At operation 102, a process can include determining network state(s) and/or device state(s). In some examples, the network state(s) can include an availability of wireless resources, such as 4G wireless resources, 5G wireless resources, an availability of dual connectivity, frequency bands, and the like. In some examples, the device state(s) can include whether the device is connected or is idle, a bearer associated with a connection, signal characteristics (e.g., strength, bandwidth, SINR, etc.) associated with wireless resources, and the like.

Various examples of network state(s) and/or device state(s) are provided as examples 104, 106, 108, 110, 112, and 114.

The example 104 illustrates a user equipment (UE) 116, a UE 118, a first network 120, and a second network 122. In some examples, the UE 116 is illustrated with a "C," which can indicate that the UE 116 is connected to one or more of the first network 120 and/or the second network 122. In the case where the UE 116 is within the geographic area indicative of the first network 120 and the second network 122, the UE 116 can be considered to be connected via dual connectivity. In some examples, the UE 118 is illustrated with an "I," which can indicate that the UE 118 is idle. In some examples, the UE 118 can be anchored via the first network 120 and/or the second network 122. In some examples, the first network 120 is illustrated with a "5G," which indicates that the first network 120 corresponds to a 5G radio access technology. In some examples, the second network 122 is illustrated with a "4G," which indicates that the second network 122 corresponds to a 4G radio access technology. The relative sizes of the first network 120 and the second network 122 represent different coverage areas and/or frequency resources. For example, a width of the first network 120 and the second network 122 represent the same coverage areas. For instances, the example 104 illustrates an implementation where the first network 120 and the second network 122 implement Band 41 (e.g., 2.5 GHz) frequency resources.

Where the 5G network represents a smaller width than the 4G network (e.g., in the example 106), the 5G network can be considered to represent a mmWave frequency resource (or other frequency resource different than the 4G network). In the example 106, the 5G network may represent a mmWave frequency resource where the 4G network may represent a Band 2 (e.g., 1900 MHz, "B2"), Band 66 (e.g., 1700 MHz, "B66"), Band 12 (e.g., 700 MHz, "B12"), Band 71 (e.g., 600 MHz, "B71"), and the like. A first scenario in the example 106 illustrates a UE idle within the 5G and 4G networks (e.g., on the left), and a second scenario in the example 106 illustrates a UE idle in the 4G network and outside a range of the 5G network (e.g., on the right).

The example 108 illustrates a UE connected within a 5G network and a 4G network (e.g., via dual connectivity).

The example 110 illustrates a UE connected in the 4G network and outside a range of a 5G network (e.g., whereby the 4G network is associated with the 5G network).

The example 112 illustrates a transition whereby a UE is connected within a 5G network and a 4G network (e.g., dual connectivity), and the UE transitions from a connected state to an idle state.

The example 114 illustrates a transition whereby a UE is connected within a 5G network (e.g., via dual connectivity or via a 5G connection, either illustrated by a "C 5G"), and the UE transitions from the dual connectivity to a 4G connection.

In some examples, the operation 102 can include a UE receiving network information from a base station (e.g., an "upperLayerindication" via a SIB2). In some examples, the operation 102 can include a UE measuring one or more signals (e.g., a 4G signal and/or a 5G signal) and to determine a strength and/or availability of a wireless resource. In some examples, the operation 102 can include a UE estimating an availability of a wireless resources based on location data, network information, signal strengths, and the like.

At operation 124, the process can include determining, based at least in part on the network state(s) and the device state(s), a policy associated with user equipment (UE). In some examples, the operation 124 can include receiving an instruction activating or otherwise implementing a particular policy associated with a UE (e.g., a first policy, a second policy, etc.). In some examples, the operation 124 can include determining a policy based on identifying whether one or more of the examples 104, 106, 108, 110, 112, and/or 114 are associated with the UE. Additional examples of determining one or more policies are provided throughout this disclosure.

At operation 126, the process can include presenting a symbol via a display of the UE. An example 128 illustrates presenting a first symbol via a display 130 of a UE 132, and an example 134 illustrates presenting a second symbol via the display 130 of the UE 132.

The UE 132 includes a display 130 for presenting information and for interacting with a user. A status bar 136 is typically shown at the top of the display 130. In this example, the status bar 136 includes a signal strength meter 138, a carrier identifier 140, and a network identifier 142 (e.g., a network identifier 142(1) in the example 128 and a network identifier 142(2) in the example 134). The status bar 128 also indicates the current time of day in a time field 144.

Although only two network identifiers 142(1) and 142(2) are illustrated it can be understood that any number of network identifiers 142 can be used in accordance with the techniques discussed herein.

The signal strength meter 136 illustrates the strength and/or quality of signals or communication channels that have been established with one or more of an LTE base station and/or an NR base station. The carrier identifier 140 corresponds to the network carrier or provider whose signals are being used for communications.

The network identifier 142 indicates the type of network that is being used by the UE 132. More specifically, the displayed network identifier 142 corresponds to and identifies the wireless communication standard that is currently being used for communications by the communication device. In the example 128, the network identifier 142(1) indicates LTE when operating in a 4G LTE environment. In the example 130, the network identifier 142(2) indicates 5G when operating in a NR (e.g., either standalone and/or dual connectivity). Other embodiments may of course have different types of networks, corresponding to different communication protocols, and may use symbols corresponding to those communication protocols. For example, a "5G" network identifier can be presented when connected via a standalone NR base station and a "DC," "EN-DC," "4G & 5G," and the like can be presented in a dual connectivity environment.

It is generally intended for the status bar 136 to show a network identifier 142 corresponding to the most advanced or highest-capability cellular network that is available for use by the UE 132. In some instances, a 5G symbol is displayed whenever the UE 132 is in a location where 5G communications are available, based at least in part on a policy, and/or in accordance with the techniques discussed herein.

Figure 2:
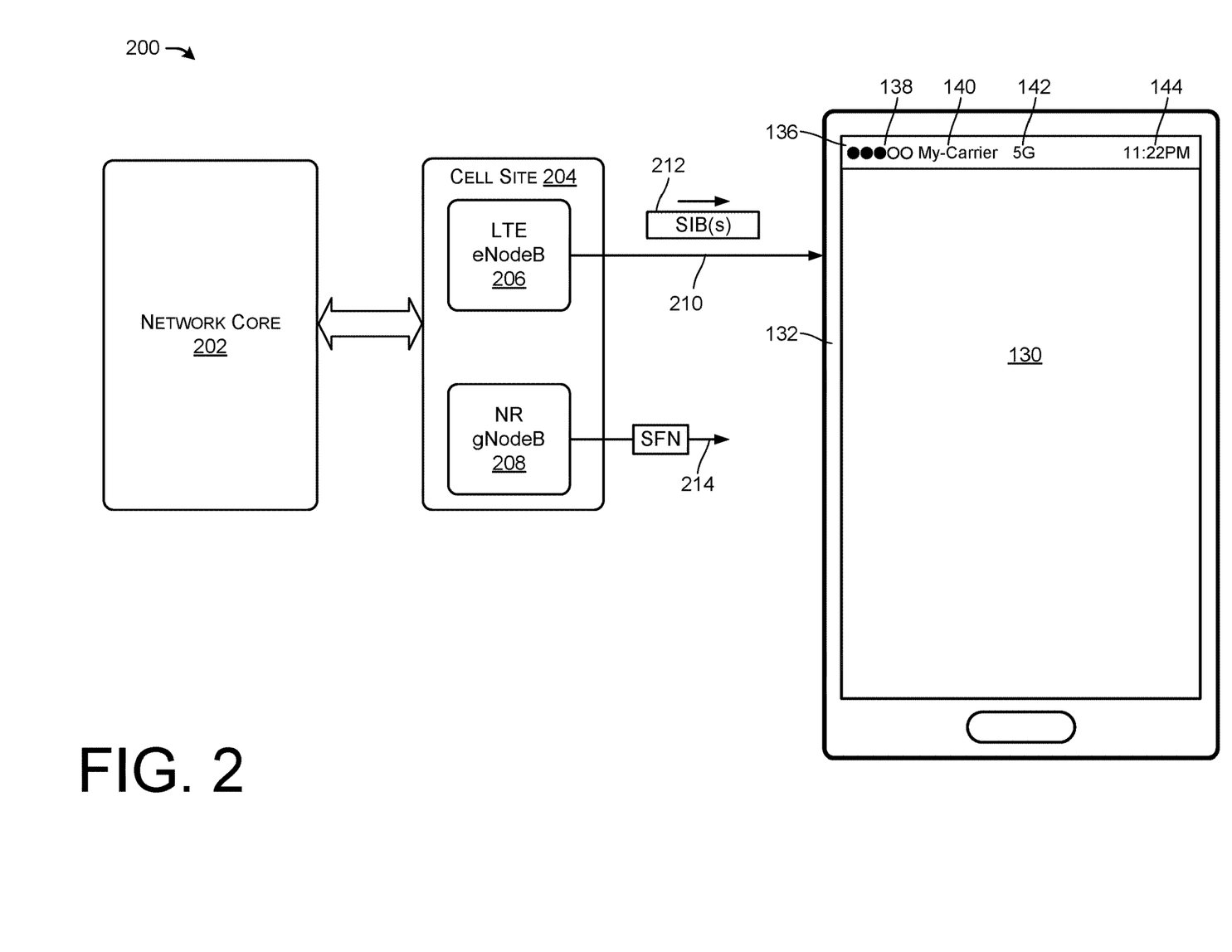
FIG. 2 is a block diagram of a communication network that implements both 4G and 5G technologies and a user equipment implementing the techniques discussed herein.

FIG. 2 is a block diagram of a communication network 200 that implements both 4G and 5G technologies and a user equipment implementing the techniques discussed herein. The communication network 200 comprises a network core 202, which may include a 4G network core and/or a 5G network core. The communication network 200 (also referred to as a communication system 200) may comprise multiple cell sites 204, only one of which is shown in FIG. 2 for purposes of discussion.

In some examples, the network core 202 may include 4G core network comprising a Mobility Management Entity (MME), a Serving Gateway (SGW), a Packet Data Network (PDN) Gateway (PGW), a Home Subscriber Server (HSS), an Access Network Discovery and Selection Function (ANDSF), an evolved Packet Data Gateway (ePDG), a Data Network (DN), and the like.

In some examples, the network core 202 can include a 5G core network comprising any of an Access and Mobility Management Function (AMF), a Session Management Function (SMF), a Policy Control Function (PCF), an Application Function (AF), an Authentication Server Function (AUSF), a Network Slice Selection Function (NSSF), a Unified Data Management (UDM), a Network Exposure Function (NEF), a Network Repository Function (NRF), a User Plane Function (UPF), a DN and the like.

The illustrated cell site 204 supports both 4G and 5G communications, and therefore has both 4G and 5G cellular access points. The 4G access point is implemented as an LTE base station 206, also referred to as an eNodeB, a master eNodeB, or a master base station. The 5G access point is implemented as an NR base station 208, also referred to as a gNodeB, a secondary gNodeB, or a secondary base station. The network core 202 communicates with the LTE base station 206 and the NR base station 208. In some implementation, radio communications are controlled by the LTE master base station 206. Other communication paths may be used in other embodiments. Note that some cell sites of the system 200 might lack 5G support, and may support only 4G services and communications.

In some instances, the LTE base station 206 is not limited to LTE technology, and may be referred to generally as a first base station 206. In some instances, the NR base station 208 is not limited to NR technology, and may be referred to generally as a second base station 208. In some instances, depending on an implementation, the LTE base station 206 can be referred to as a master base station while the NR base station 208 can be referred to as a secondary base station. In some instances (e.g., in a MR-DC context), depending on an implementation (e.g., Option 4), the LTE base station 206 can be referred to as a secondary base station while the NR base station 208 can be referred to as a master base station. In some instances, the LTE base station 206 and the NR base station 208 may be referred to a base station 206 and a base station 208, respectively.

FIG. 2 also shows a single UE 132 (also referred to as a cellular communication device 132 or a device 132), which may be one of many such devices that are configured for use with the communication network 200. In the described embodiment, the UE 132 supports both 4G/LTE and 5G/NR networks and communications. Accordingly, the UE 132 includes an LTE radio (not shown) that communicates wirelessly with a LTE base station 206 of the cell site 204 and an NR radio (not shown) that communicates wirelessly with the NR base station 208 of the cell site 204.

The device 132 may comprise any of various types of wireless cellular communication devices that are capable of wireless data and/or voice communications, including smartphones and other mobile devices, "Internet-of-Things" (IoT) devices, smart home devices, computers, wearable devices, entertainment devices, industrial control equipment, etc. Further examples can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of UEs include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

In general, the UE 132 can include any device that is capable of transmitting/receiving data wirelessly using any suitable wireless communications/data technology, protocol, or standard, such as Global System for Mobile communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future Internet Protocol (IP)-based network technology or evolution of an existing IP-based network technology. The UE 132 can implement enhanced Mobile Broadband (eMBB) communications, Ultra Reliable Low Latency Communications (URLLCs), massive Machine Type Communications (mMTCs), and the like.

The device 132 may communicate through either or both of the LTE base station 206 and the NR base station 208. In some instances, the device 132 may support Dual Connectivity communications, in which a single communication session might simultaneously use both a 4G connection and a 5G connection. More specifically, the device 132 may operate using what is referred to as a Non-Standalone Architecture (NSA), using 5G radio technologies to augment 4G communication capabilities. When using NSA, the device 132 can use both an LTE carrier and an NR carrier for downlink data reception and uplink transmissions.

When the device 132 is in idle mode, it can receive an LTE Radio Resource Control (RRC) signal 210 from the LTE base station 206. The RRC signal 210 may be broadcast for reception by multiple communication devices, and may contain information regarding capabilities and characteristics of the LTE base station 206. For example, RRC messaging may include information needed by a communication device to establish bi-directional communications with the LTE base station 206. In the LTE environment, at least some of this information is provided in a periodically broadcast master information block (MIB) and multiple system information blocks (SIBs). FIG. 2 shows a single SIB 212 that is being broadcast by the LTE base station 206. The SIB 212 can be received by multiple communication devices, including the illustrated device 132.

The device 132 does not necessarily maintain a connection with the NR base station 208 when the device 132 is operating in idle mode. Furthermore, the NR base station 208 may not transmit SIBs or other RRC signaling. However, 3GPP specifications indicate that the NR base station 208 is to transmit System Frame Numbers (SFNs) that are used for timing of communications. FIG. 2 shows an RF SFN signal 214 transmitted by the NR base station 208. The RF SFN signal 214 is used to convey SFN information.

In certain embodiments, the device 132 does not monitor or decode the NR SFN information when the device 132 is in idle mode. Although the RF SFN signal 214 may be broadcast and available to the device 132, when in idle mode the communication device 132 does not demodulate or decode the RF SFN signal 214 to obtain the SFNs.

As noted above, the device 132 includes the display 130 for presenting information and for interacting with a user. The status bar 136, the signal strength meter 138, the carrier identifier 140, the network identifier 142, and the time field 144 are discussed above and throughout this disclosure.

In certain implementations, a network availability indicator is included in one of the SIB(s) 212 that is broadcast periodically by the LTE base station 206. The network availability indicator indicates whether the LTE base station 206 is in a geographic area within which 5G services are available. More specifically, the LTE base station 206 includes the network availability indicator when the LTE base station 206 is associated with a 5G base station (e.g., the 5G base station 208) and configured to support NSA Dual Connectivity in conjunction with the 5G base station.

In some embodiments, the network identifier 142 may comprise a variable in the SIB, where the variable has a positive value when 5G services are available, and a negative value when 5G services are not available. In some embodiments, this variable comprises an "upperLayerindication" value that is contained in SIB2, in accordance with 3GPP TS 36.331 Release 15.

Figure 3A:
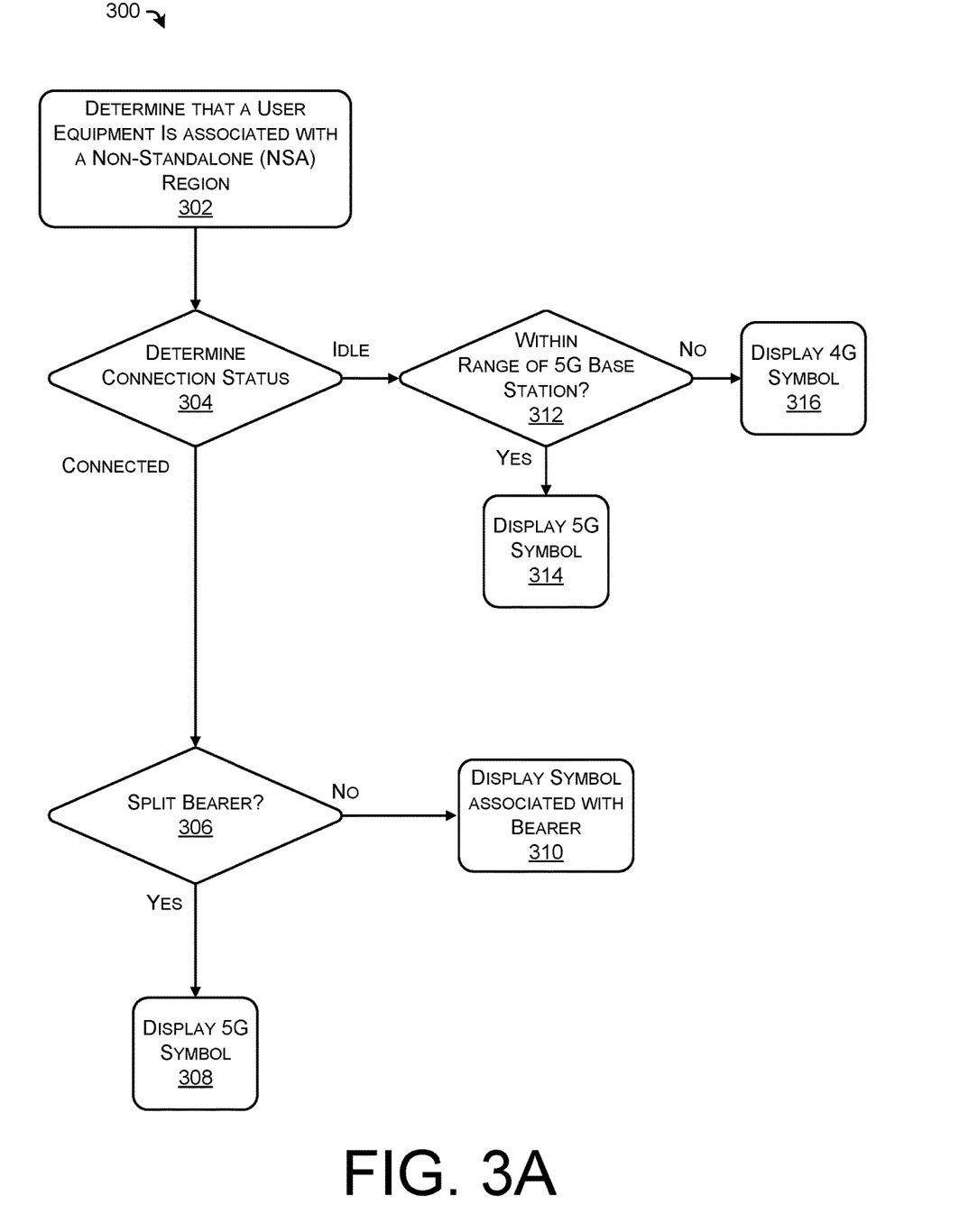
FIG. 3A is an example process for displaying a symbol indicative of wireless resources based on a connection status, bearer, and/or whether a user equipment is within range of a 5G base station.

FIG. 3A is an example process 300 for displaying a symbol indicative of wireless resources based on a connection status, bearer, and/or whether a user equipment is within range of a 5G base station. The example process 300 can be performed by the UE 132, in connection with other components and/or devices discussed herein. Some or all of the process 300 can be performed by one or more devices or components in the network 200, for example.

At operation 302, the process can include determining that a user equipment is associated with anon-standalone (NSA) region. In some instances, the operation 302 can include receiving an indication from a base station (e.g., a 4G base station) that the base station is associated with NSA. In some examples, the operation 302 can include receiving an "upperLayerindication" value indicating a base station supports dual connectivity.

At operation 304, the process can include determining a connection status. If the connection status is connected, the process continues to operation 306.

At operation 306, the process can include determining whether the connection is associated with a split bearer. In some examples, bearers may include, but are not limited to, one or more of a master cell group (MCG) bearer, a secondary cell group (SCG) bearer, an MCG split bearer or an SCG split bearer (referred to collectively as a split bearer), or an MCG bearer anchored on an SCG. In the case where an LTE base station is the master node, the MCG bearer can also be referred to as a 4G bearer. In the case where a NR base station is the secondary node, the 5G bearer can correspond to the SCG bearer. In some instances, a UE may be connected via a 4G connection and a 5G connection (e.g., via dual connectivity) individually via a 4G bearer and a 5G bearer or via a split bearer (e.g., a MCG split bearer or an SCG split bearer). In some instances, signaling radio bearers can be assigned independently of or in conjunction with data radio bearers.

If the connection is associated with a split bearer (e.g., "yes" in the operation 306), the process can continue to operation 308, which can include displaying a 5G symbol on a display of a UE. In some examples, the operation 308 can include displaying a symbol indicative of the split bearer on a display of a UE.

If the connection is not associated with a split bearer (e.g., "no" in the operation 306), the process can continue to operation 310, which may include displaying a symbol associated with the bearer. For example, if the bearer is a 4G bearer, the operation 310 can include displaying a symbol associated with a 4G wireless resource. If the bearer is a 5G bearer, the operation 310 can include displaying a symbol associated with a 5G wireless resource.

At operation 304, if the connection status is idle, the process can continue to operation 312, which can include determining whether the UE is within range of a 5G base station.

If the UE is within range of a 5G base station (e.g., "yes" in the operation 312) the process can continue to operation 314, which can include displaying a 5G symbol.

If the UE is not within range of a 5G base station (e.g., "no" in the operation 312) the process can continue to operation 316, which can include displaying a 4G symbol.

In some examples, the operation 312 can include receiving location information indicative of a location of the UE and determining, based at least in part on a distance between a 5G base station and the location of the UE, whether the UE is within the range of the 5G base station (e.g., whether a distance between the UE and the 5G base station is below a threshold distance). In some instances, the operation 312 can include actively sensing a 5G signal to determine if a signal strength is above a threshold value. In some examples, the operation 312 can include determining a frequency associated with the 5G resource and the 4G resource. For example, where the 5G resource and the 4G resource use a same or similar frequency band, the operation 312 can include determining that the resource coverage may be coextensive or otherwise similar.

Figure 3B:
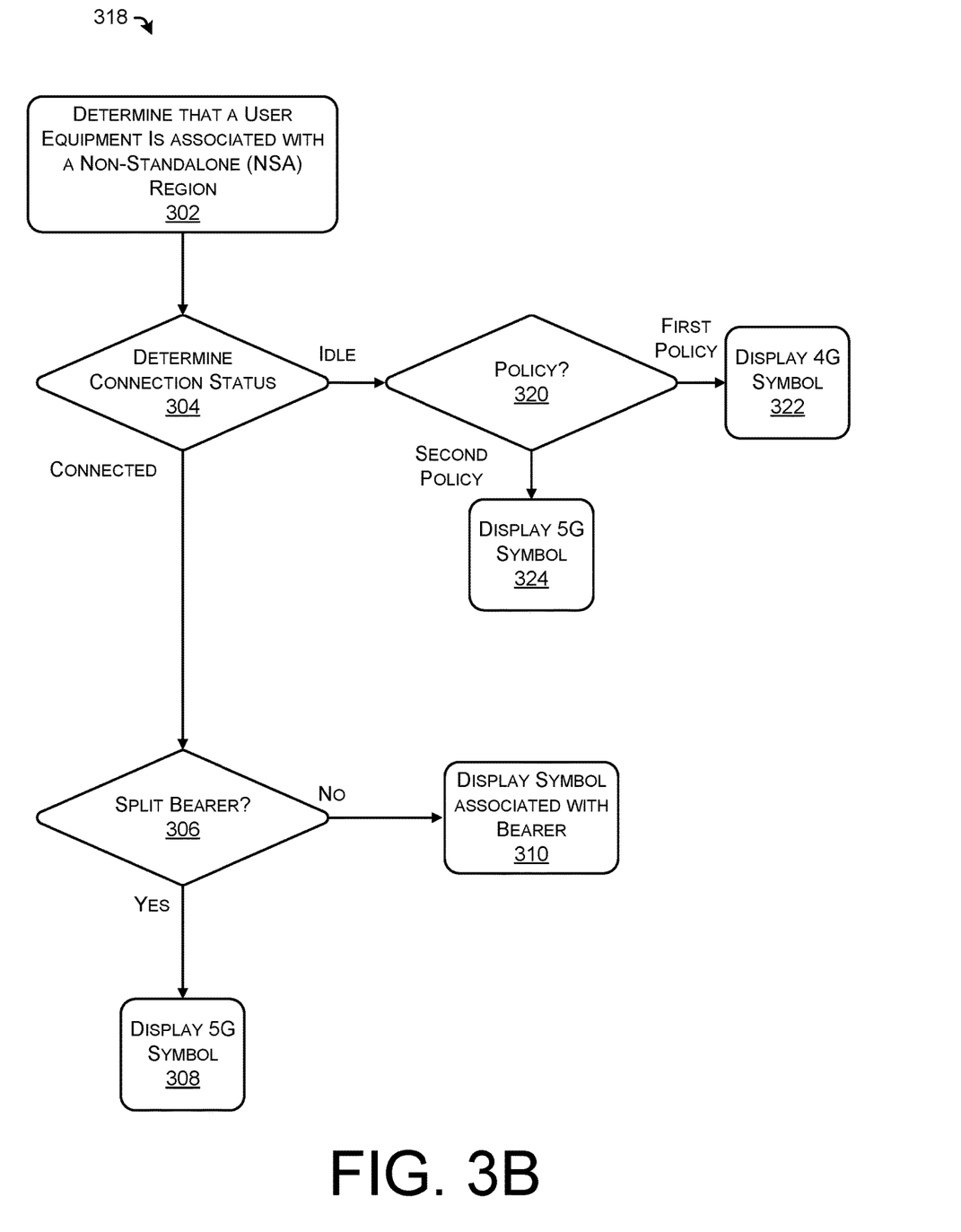
FIG. 3B is an example process for displaying a symbol indicative of wireless resources based on a connection status, bearer, and/or a policy.

FIG. 3B is an example process 318 for displaying a symbol indicative of wireless resources based on a connection status, bearer, and/or a policy. The example process 318 can be performed by the UE 132, in connection with other components and/or devices discussed herein. Some or all of the process 300 can be performed by one or more devices or components in the network 200, for example.

In some examples, the process 318 can include similar operations 302, 304, 306, 308, and/or 310 as discussed above in connection with the process 300.

In some examples, when the operation 304 determines that the connection status is idle, the process 318 can continue to an operation 320, which may include determining a policy for displaying a symbol, in accordance with the techniques discussed herein.

For example, the operation 320 can include receiving an indication, instruction, message, or the like from a network resource (e.g., a service provider) selecting a policy for presenting symbols. In some examples, an indication of a policy can be stored in a memory of a UE. In a case where the operation 320 determines a first policy, the process continues to operation 322. As discussed above, in some examples a first policy can be considered to be a "conservative" policy whereby a symbol is based on a wireless resource presence. In the case where a UE is anchored via a 4G base station, the first policy would indicate to display a 4G symbol.

In a case where the operation 320 determines a second policy, the process continues to 324. As discussed above, in some examples a second policy can be considered to be an "aggressive" policy whereby the symbol presented is a 5G symbol. In some examples, the second policy can be based in part on LTE SIB2 information (e.g., indicating that a base station is capable of providing dual connectivity, whereby the base station is a 4G base station and the UE is anchored (idling) via the 4G base station).

Figure 4:
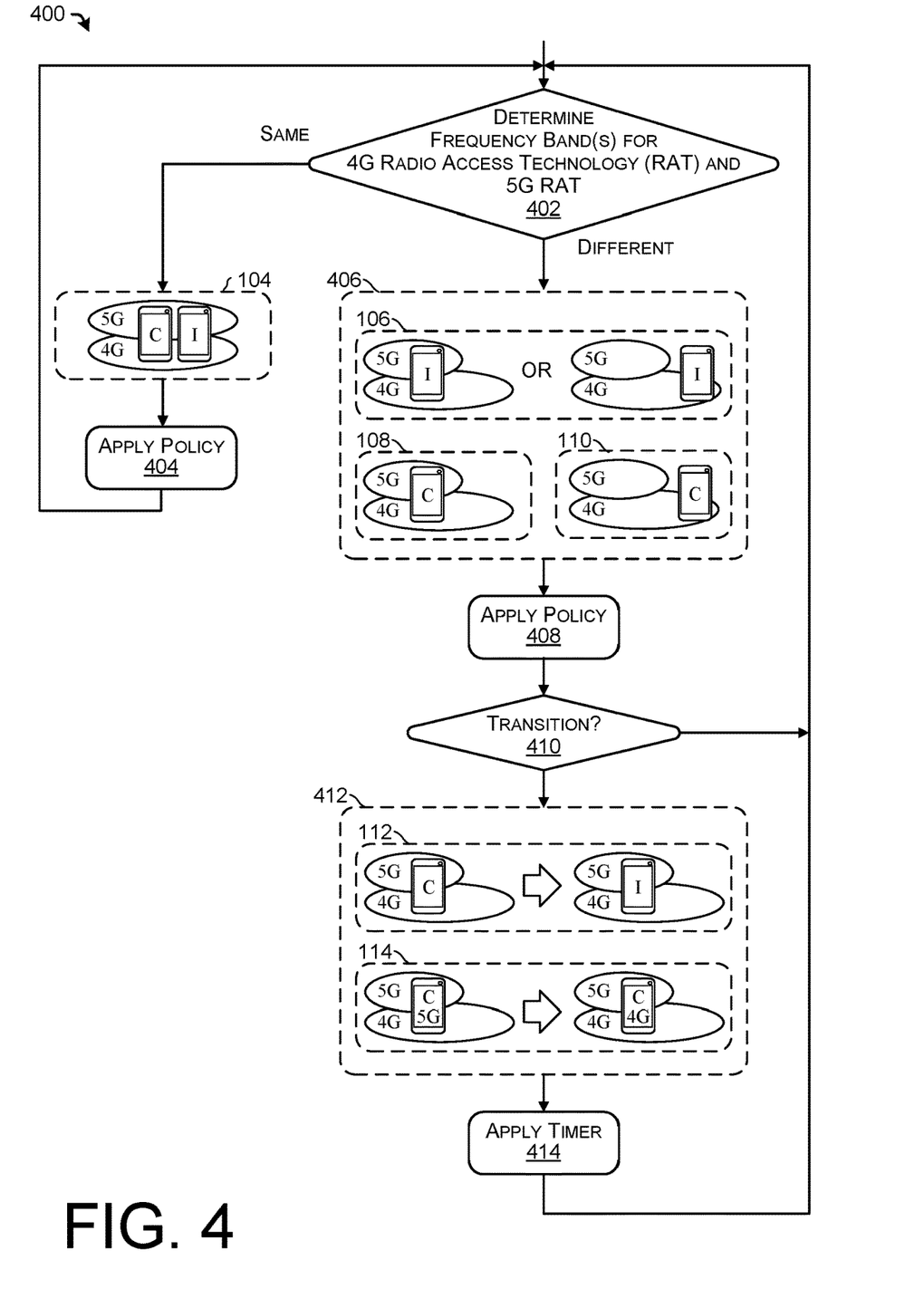
FIG. 4 is a pictorial flow diagram for displaying a symbol indicative of wireless resources based on a policy.

FIG. 4 is a pictorial flow diagram of an example process 400 for displaying a symbol indicative of wireless resources based on a policy. The example process 400 can be performed by the UE 132, in connection with other components and/or devices discussed herein. Some or all of the process 400 can be performed by one or more devices or components in the network 200, for example.

At operation 402, the process can include determining frequency band(s) for 4G radio access technology (RAT) and for 5G radio access technology. In some examples, the operation 402 can include determining that a region is associated with a 4G base station (or 4G RAT) and a 5G base station (or 5G RAT). In some examples, the operation 402 can include receiving a Radio Resource Control (RRC) and/or a System Information Block (SIB) comprising information indicative of available RATs.

By way of example and without limitation, example frequency bands include Band 41, Band 2, Band 66, Band 12, and/or Band 71.

In some examples, the operation 402 can include determining that the frequency band(s) for the 4G RAT and the 5G RAT are the same frequency band(s). Such a scenario is illustrated by the example 104, whereby the 5G RAT and the 4G RAT both use a Band 41. In such as case, the process continues to the operation 404, which includes applying a policy. In some examples, the policy applied in the operation 404 can include presenting a 5G symbol. In some examples, the symbol may not change until the UE hands over to anther cell (or is otherwise connected to another cell).

In some examples, the operation 402 can include determining that the frequency band(s) for the 4G RAT and the 5G RAT are different. For example, the 4G RAT may use one or more of Band 2, Band 66, Band 12, Band 71, and the like. In some instances, the 5G RAT may use a mmWave frequency band (or a frequency band that may otherwise be different than the 4G RAT). Such different frequencies are illustrated by differing widths of the 4G RAT and the 5G RAT in an example 406.

The example 406 comprises the examples 106, 108, and 110. In some examples, the process continues to operation 408 whereby a policy is applied to determine a symbol for presenting a symbol indicative of a wireless resource. Examples of policies are discussed in connection with FIGS. 1, 3A, and 3B, as well as throughout this disclosure.

At operation 410, the process can include determining whether a transition is associated with a UE. For example, if there is a transition (e.g., illustrated by the examples 412), the process can include an operation 414, which may include applying a timer to refrain from changing a symbol for a predetermined period of time. In some examples, a time period associated with the operation 414 may include 5 seconds, 30 seconds, 1 minutes, or any time period. The example 412 illustrates examples 112 and 114, which illustrate transitions. The example 112 illustrates a scenario where a UE is connected (e.g., via dual connectivity) and subsequently transitions to an idle state. In this example 112, the operation 414 would apply a timer, thereby preventing a symbol from changing on the UE until expiration of the timer. The example 114 illustrates a scenario where a UE is connected (e.g., via dual connectivity or via a 5G connection) and subsequently the 5G connection is interrupted. In such a case, the operation 414 would prevent a symbol from changing on the UE until expiration of a timer.

In some examples, aspects of the process 400 can be performed continuously, on demand, and/or at any regular or irregular intervals to determine a symbol to present via a display of a UE. The examples are not intended to be limiting and other example implementations are considered herein.

Figure 5:
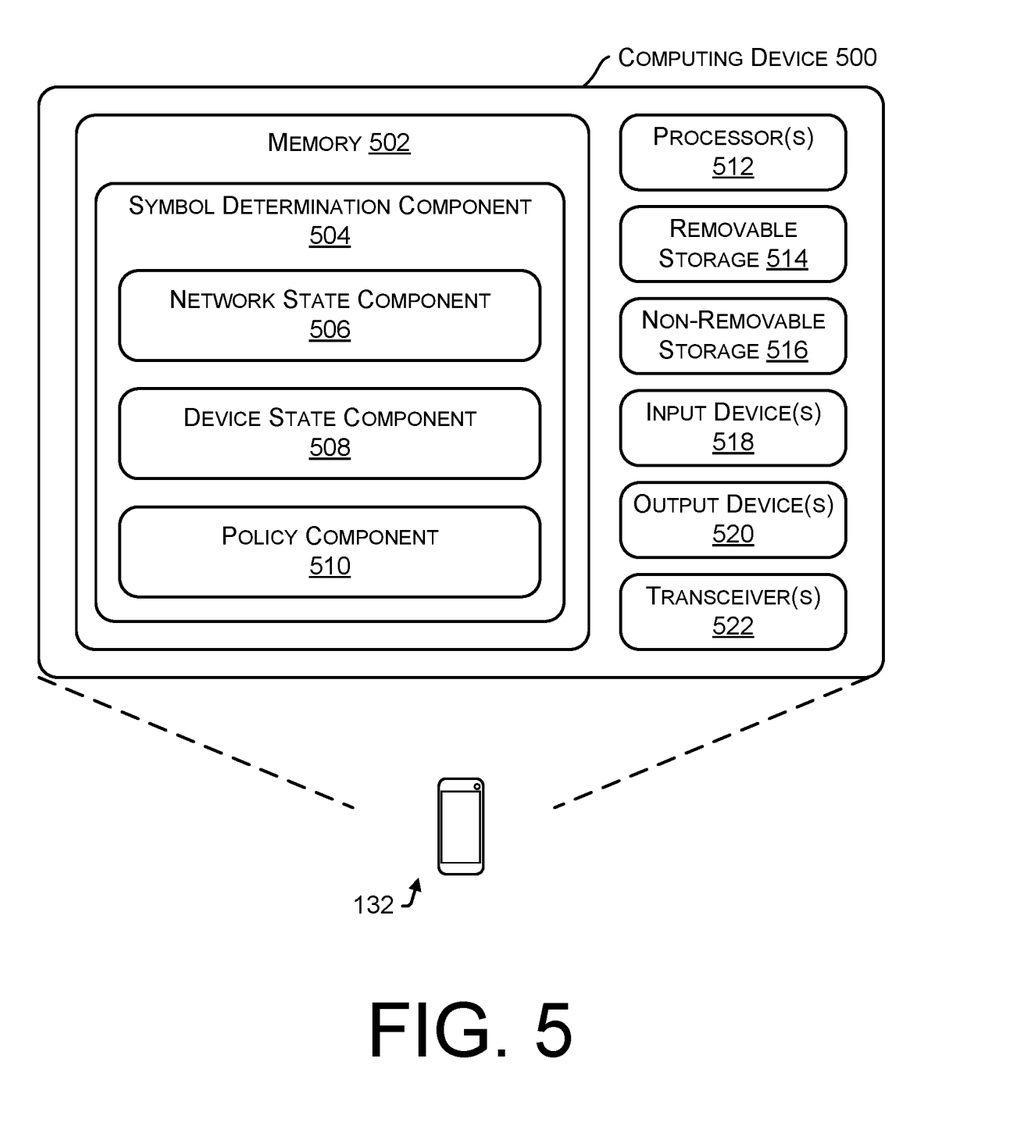
FIG. 5 illustrates an example computing device to implement the symbol determination techniques, as described herein.

FIG. 5 illustrates an example computing device to implement the symbol determination techniques, as described herein. In some embodiments, the computing device 500 can correspond to the UE 132 of FIG. 1. It is to be understood in the context of this disclosure that the computing device 500 can be implemented as a single device, as a plurality of devices, or as a system with components and data distributed among them.

As illustrated, the computing device 500 comprises a memory 502 storing a symbol determination component 504 comprising a network state component 506, a device state component 508, and a policy component 510. Also, the computing device 500 includes processor(s) 512, a removable storage 514 and non-removable storage 516, input device(s) 518, output device(s) 520, and transceiver(s) 522.

In various embodiments, the memory 502 is volatile (such as RAM), non-volatile (such as ROM, flash memory, etc.) or some combination of the two. The symbol determination component 504, the network state component 506, the device state component 508, and the policy component 510 stored in the memory 502 can comprise methods, threads, processes, applications or any other sort of executable instructions. The symbol determination component 504, the network state component 506, the device state component 508, and the policy component 510 can also include files and databases.

In general, the symbol determination component 504 can include functionality to determine a state of a network and/or a device, and an applicable policy, for displaying or otherwise presenting a symbol indicative of a wireless resource. In some examples, the symbol determination component 504 can present a 4G or 5G symbol (or any other symbol) on a display of a UE in accordance with the techniques discussed herein.

In some examples, the network state component 506 can include functionality to receive network information or otherwise determine a state of network resources. In some examples, the network state component 506 can determine whether 4G wireless resources and/or 5G wireless resources are available to a UE (e.g., via an RRC, SIB, and/or upperLayerindication flag). In some examples, the network state component 506 can determine a signal strength of one or more of a 4G signal or 5G signal. In some examples, the network state component 506 can estimate an availability of the 5G base station based least in part on a signal strength associated with the 4G base station. For example, based on the signal strength of a 4G signal, the network state component 506 can look up or determine (e.g., via a look up table associated with a particular location and/or frequency combinations (e.g., of the 4G base station and the 5G base station)), what an estimated signal strength of the 5G base station is expected to be.

In some examples, the device state component 508 can include functionality to determine a connection state of a UE. For example, the device state component 508 can determine whether the UE is connection or idle.

In some examples, the policy component 510 can include functionality to determine a policy associated with presenting a symbol, as discussed herein. In some examples, the policy component 510 can receive a message or instruction to activate a policy for presenting a symbol (e.g., a first policy ("conservative"), a second policy ("aggressive"), and the like). In some examples, based on the network state, the device state, and/or an applicable policy, the symbol determination component 504 can determine a symbol to present indicative of a wireless resource.

In some embodiments, the processor(s) 512 is a central processing unit (CPU), a graphics processing unit (GPU), or both CPU and GPU, or other processing unit or component known in the art.

The computing device 500 also includes additional data storage devices (removable and/or non-removable) such as, for example, magnetic disks, optical disks, or tape. Such additional storage is illustrated in FIG. 5 by removable storage 514 and non-removable storage 516. Tangible computer-readable media can include volatile and non-volatile, removable and non-removable media implemented in any method or technology for storage of information, such as computer readable instructions, data structures, program modules, or other data. The memory 502, the removable storage 514 and the non-removable storage 516 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the computing device 500. Any such tangible computer-readable media can be part of the computing device 500.

The computing device 500 may be configured to communicate over a telecommunications network using any common wireless and/or wired network access technology. Moreover, the computing device 500 may be configured to run any compatible device operating system (OS), including but not limited to, Microsoft Windows Mobile, Google Android, Apple iOS, Linux Mobile, as well as any other common mobile device OS.

The computing device 500 also can include input device(s) 518, such as a keypad, a cursor control, a touch-sensitive display, voice input device, etc., and output device(s) 520 such as a display, speakers, printers, etc. These devices are well known in the art and need not be discussed at length here.

As illustrated in FIG. 5, the computing device 500 also includes one or more wired or wireless transceiver(s) 522. For example, the transceiver(s) 522 can include a network interface card (NIC), a network adapter, a LAN adapter, or a physical, virtual, or logical address to connect to various networks, devices, or components illustrated in the network 200, for example. To increase throughput when exchanging wireless data, the transceiver(s) 522 can utilize multiple-input/multiple-output (MIMO) technology. The transceiver(s) 522 can comprise any sort of wireless transceivers capable of engaging in wireless, radio frequency (RF) communication. The transceiver(s) 522 can also include other wireless modems, such as a modem for engaging in Wi-Fi, WiMAX, Bluetooth, infrared communication, and the like.

FIGS. 1, 3A, 3B, 4, and 6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 6:
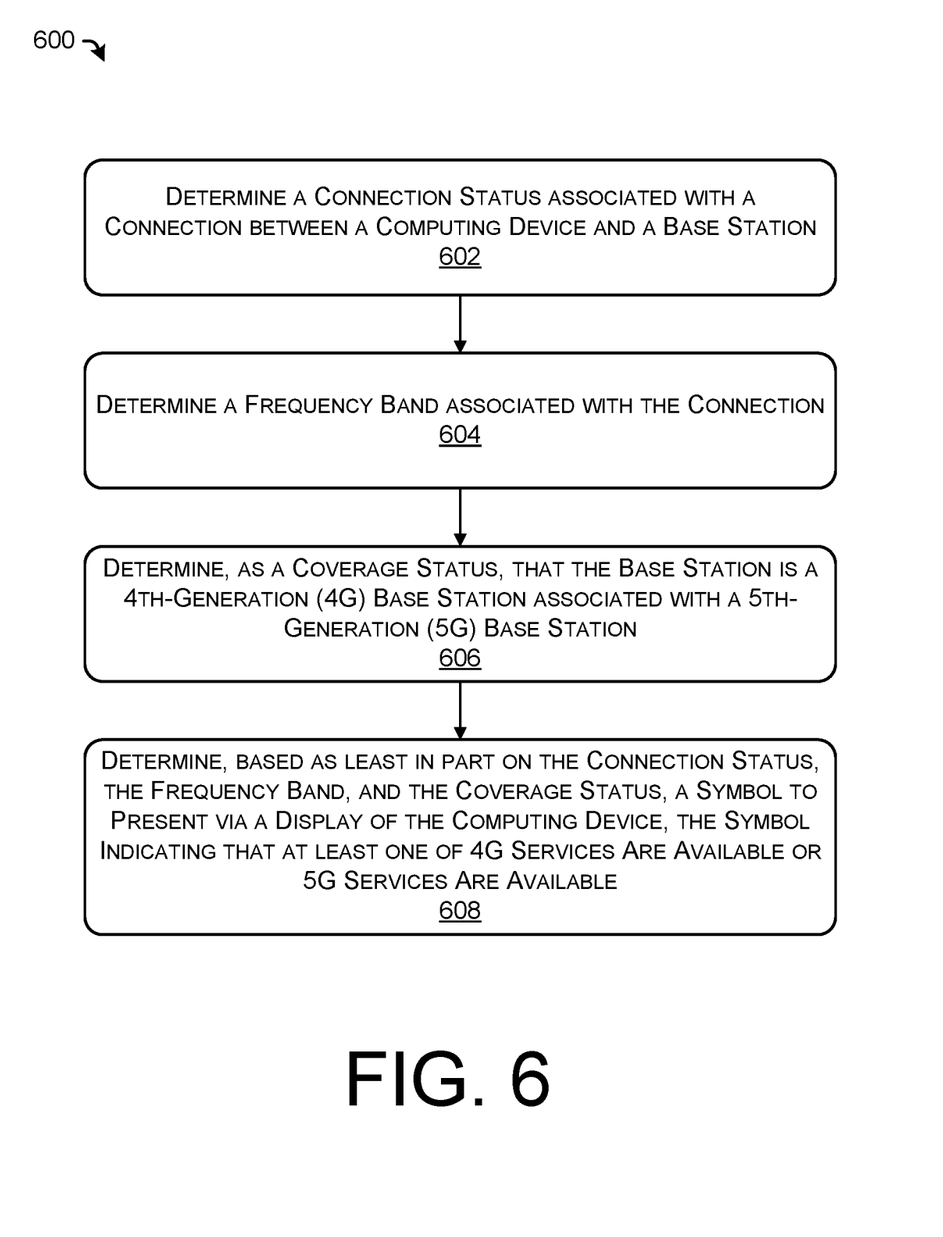
FIG. 6 illustrates an example process for determining network and/or device states and determining a symbol indicative of wireless resources to present via a computing device.

FIG. 6 illustrates an example process 600 for determining network and/or device states and determining a symbol indicative of wireless resources to present via a computing device. The example process 600 can be performed by the symbol determination component 504 (or another component), in connection with other components and/or devices discussed herein. Some or all of the process 600 can be performed by one or more devices or components in the network 200, for example.

At operation 602, the process can include determining a connection status associated with a connection between a computing device (e.g., a UE) and a base station. In some examples, the connection status can include a connected state or an idle state.

At operation 604, the process can include determining a frequency band associated with the connection. For example, frequency bands can include Band 41, Band 2, Band 66, Band 12, Band 71, and the like. In some examples, the frequency bands can include one or more mmWave frequency bands (e.g., associated with a 5G base station).

At operation 606, the process can include determining, as a coverage status, that the base station is a 4th-Generation (4G) base station associated with a 5th-Generation (5G) base station. In some examples, the operation 606 can include receiving a RRC, SIB, and/or another indication of whether a 4G base station is associated with a 5G base station to provide dual connectivity. In some examples, the operation 606 can include measuring, estimating, or otherwise determining a quality of a 4G signal and/or a 5G signal.

At operation 608, the process can include determining, based at least in part on the connection status, the frequency band, and the coverage status, a symbol to present via a display of the computing device, the symbol indicating that at least one of 4G services are available or that 5G services are available. In some examples, the operation 608 can include determining a symbol based on a policy, as discussed herein. Aspects of policies are discussed in connection with FIGS. 1, 3A, 3B, and 4.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device comprising:
one or more processors;
a memory; and
one or more components stored in the memory and executable by the one or more processors to perform operations comprising:
  determining a connection status associated with a connection between the computing device and a base station is in an idle mode;
  determining a frequency band associated with the connection;
  determining a policy based at least in part on the frequency band and the connection status being in the idle mode;
  determining, as a coverage status, that the base station is a 4th-Generation (4G) base station associated with a 5th-Generation (5G) base station; and
  determining, based at least in part on the policy and the coverage status, a symbol to present via a display of the computing device, the symbol indicating that at least one of 4G services are available or 5G services are available.

2. The computing device of claim 1, the operations further comprising:
determining a radio access technology associated with the connection;
wherein the radio access technology indicates at least one of a 4G connection or a 5G connection.

3. The computing device of claim 2, wherein the radio access technology is a first radio access technology indicating that the connection comprises the 4G connection and the 5G connection at a first time, and wherein the operations further comprise:
determining, at a second time after the first time, that the connection comprises the 4G connection without the 5G connection;
starting a timer based at least in part on the connection comprising the 4G connection without the 5G connection at the second time; and
determining to present the symbol indicating that 5G services are available based at least in part on the timer.

4. The computing device of claim 1, wherein:
the connection is anchored via the 4G base station;
the frequency band indicates a B41 frequency band; and
the operations further comprise:
  determining the symbol to indicate that the 5G services are available.

5. The computing device of claim 1, wherein:
the connection is anchored via the 4G base station; and
the operations further comprise at least one of:
  estimating an availability of the 5G base station based least in part on a signal strength associated with the 4G base station; or
  measuring a signal strength associated with the 5G base station.

6. The computing device of claim 1, wherein:
the connection is associated with a 4G connection; and
determining the symbol to present via the display includes selecting the symbol to indicate that 4G services are available.

7. The computing device of claim 1, wherein determining the coverage status comprises at least one of:
receiving a System Information Block (SIB) from the 4G base station; or
receiving a Radio Resource Control (RRC) message from the 4G base station.

8. A system comprising:
one or more processors;
a memory; and
one or more components stored in the memory and executable by the one or more processors to perform operations comprising:
  determining a connection status associated with a connection between a computing device and a base station is in an idle mode;
  determining a frequency band associated with the connection;
  determining a policy based at least in part on the frequency band and the connection status being in the idle mode;
  determining, as a coverage status, that the base station is a 4th-Generation (4G) base station associated with a 5th-Generation (5G) base station; and
  determining, based at least in part on the policy and the coverage status, a symbol to present via a display of the computing device, the symbol indicating that at least one of 4G services are available or 5G services are available.

9. The system of claim 8, the operations further comprising:
determining a radio access technology associated with the connection;

wherein the radio access technology indicates at least one of a 4G connection or a 5G connection.

10. The system of claim 9, wherein the radio access technology is a first radio access technology indicating that the connection comprises the 4G connection and the 5G connection at a first time, and wherein the operations further comprise:
    determining, at a second time after the first time, that the connection comprises the 4G connection without the 5G connection;
    starting a timer based at least in part on the connection comprising the 4G connection without the 5G connection at the second time; and
    determining to present the symbol indicating that 5G services are available based at least in part on the timer.

11. The system of claim 8, wherein:
    the connection is anchored via the 4G base station;
    the frequency band indicates a B41 frequency band; and
    the operations further comprise:
        determining the symbol to indicate that the 5G services are available.

12. The system of claim 8, wherein:
    the connection is anchored via the 4G base station; and
    the operations further comprise at least one of:
        estimating an availability of the 5G base station based least in part on a signal strength associated with the 4G base station; or
        measuring a signal strength associated with the 5G base station.

13. The system of claim 8, wherein determining the coverage status comprises at least one of:
    receiving a System Information Block (SIB) from the 4G base station; or
    receiving a Radio Resource Control (RRC) message from the 4G base station.

14. A processor-implemented method comprising:
    determining a connection status associated with a connection between a computing device and a base station is in an idle mode;
    determining a frequency band associated with the connection;
    determining a policy based at least in part on the frequency band and the connection being in the idle mode;
    determining, as a coverage status, that the base station is a 4th-Generation (4G) base station associated with a 5th-Generation (5G) base station; and
    determining, based at least in part on the policy and the coverage status, a symbol to present via a display of the computing device, the symbol indicating that at least one of 4G services are available or 5G services are available.

15. The processor-implemented method of claim 14, further comprising:
    determining a radio access technology associated with the connection;
    wherein the radio access technology indicates at least one of a 4G connection or a 5G connection.

16. The processor-implemented method of claim 15, wherein the radio access technology is a first radio access technology indicating that the connection comprises the 4G connection and the 5G connection at a first time, the processor-implemented method further comprising:
    determining, at a second time after the first time, that the connection comprises the 4G connection without the 5G connection;
    starting a timer based at least in part on the connection comprising the 4G connection without the 5G connection at the second time; and
    determining to present the symbol indicating that 5G services are available based at least in part on the timer.

17. The processor-implemented method of claim 14, wherein:
    the connection status indicates that connection is associated with an idle mode;
    the connection is anchored via the 4G base station;
    the frequency band indicates a B41 frequency band; and
    the processor-implemented method further comprises:
        determining the symbol to indicate that the 5G services are available.

18. The processor-implemented method of claim 14, wherein:
    the connection status indicates that connection is associated with an idle mode;
    the connection is anchored via the 4G base station; and
    the processor-implemented method further comprises at least one of:
        estimating an availability of the 5G base station based least in part on a signal strength associated with the 4G base station; or
        measuring a signal strength associated with the 5G base station.

19. The computing device of claim 1, wherein the policy is associated with the UE.

20. The computing device of claim 1, wherein the policy is an aggressive policy associated with the capabilities of the base station.

* * * * *